United States Patent
Ueura

(10) Patent No.: US 8,430,386 B2
(45) Date of Patent: Apr. 30, 2013

(54) WAVE TYPE LINEAR MOTION MECHANISM AND HOLDING MECHANISM

(75) Inventor: Keiji Ueura, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 298 days.

(21) Appl. No.: 13/057,056

(22) PCT Filed: Aug. 22, 2008

(86) PCT No.: PCT/JP2008/002278
§ 371 (c)(1),
(2), (4) Date: Feb. 1, 2011

(87) PCT Pub. No.: WO2010/021015
PCT Pub. Date: Feb. 25, 2010

(65) Prior Publication Data
US 2011/0133382 A1 Jun. 9, 2011

(51) Int. Cl.
*B25B 1/00* (2006.01)
*B25B 1/20* (2006.01)
*B25B 1/02* (2006.01)
*B25B 5/00* (2006.01)
*B23Q 3/08* (2006.01)
*B23Q 3/02* (2006.01)

(52) U.S. Cl.
USPC ............... 269/86; 269/43; 269/45; 269/246; 269/6; 269/3; 269/24; 269/32; 269/95; 269/136; 269/166; 269/175

(58) Field of Classification Search ............ 269/43–246
See application file for complete search history.

(56) References Cited

FOREIGN PATENT DOCUMENTS

| JP | 6-38195 Y2 | 10/1994 |
|---|---|---|
| JP | 8-200465 A | 8/1996 |
| JP | 9-038884 A | 2/1997 |
| JP | 2007-154955 A | 6/2007 |

OTHER PUBLICATIONS

Machine translation of JP 2007-154955 "direct-acting actuator" by Kageyama Hiromitsu et al.*
International Search Report (PCT/ISA/210) issued on Oct. 28, 2008, by Japanese Patent Office as the International Searching Authority for International Application No. PCT/JP2008/002278.

* cited by examiner

*Primary Examiner* — Monica Carter
*Assistant Examiner* — Nirvana Deonauth
(74) *Attorney, Agent, or Firm* — Buchanan Ingersoll & Rooney PC

(57) ABSTRACT

In a wave linear motion mechanism (4) of a holding mechanism (1), those portions of a flexible screw (14) where first and second male screws (32, 33) are formed are elliptically deformed by first and second wave generators (12, 13) installed on an input shaft (11), and the first and second male screws (32, 33) are respectively partially engaged with first and second female screws (42, 44) of first and second circular nuts (15, 16). First and second holding members (5, 6) are mounted on the first and second circular nuts (15, 16), respectively. When the input shaft (11) is rotated by a motor (3), the first and second holding members (5, 6) are opened or closed depending on the rotation direction to release or hold an object (W).

4 Claims, 1 Drawing Sheet

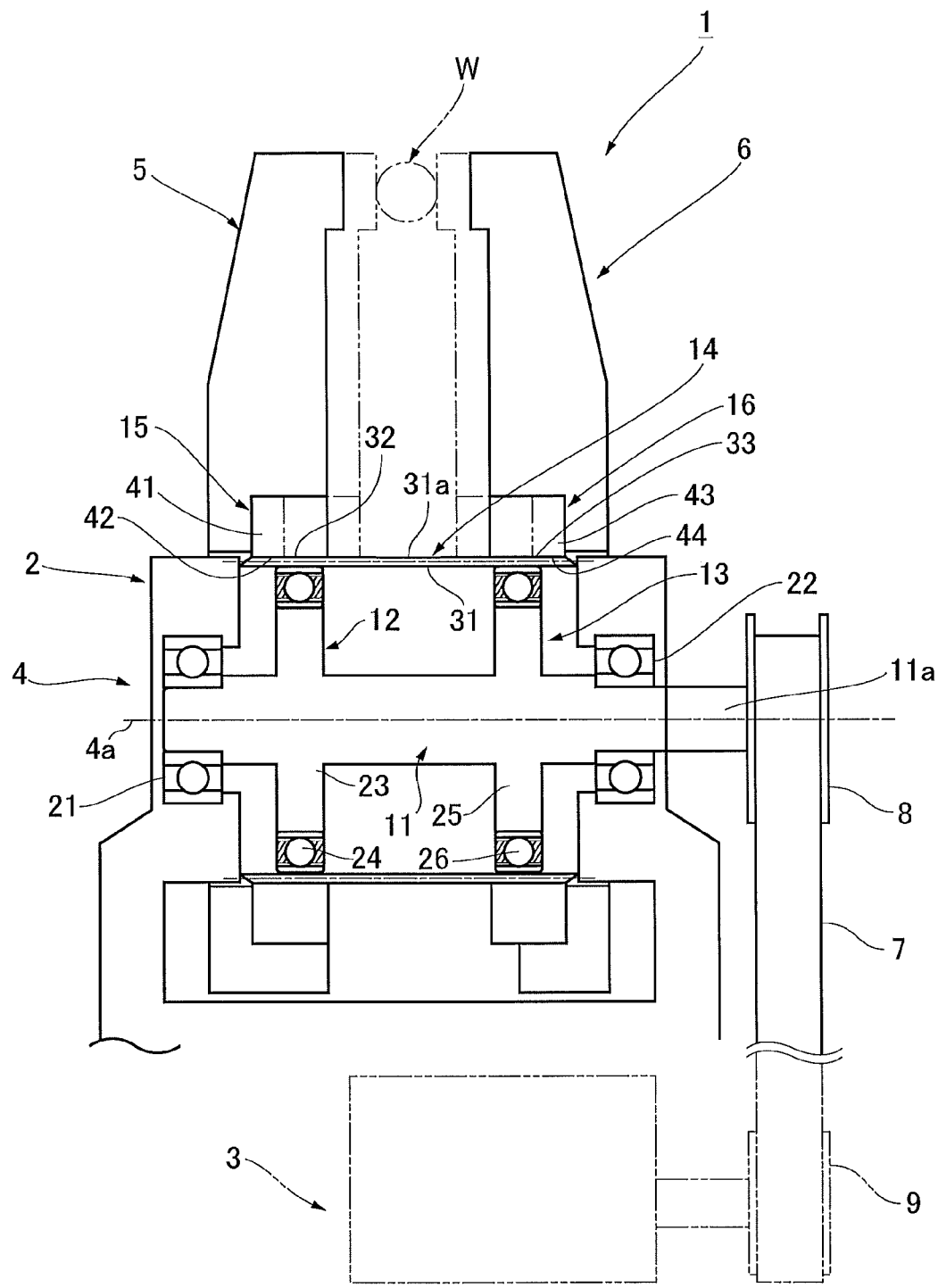

WAVE TYPE LINEAR MOTION MECHANISM AND HOLDING MECHANISM

TECHNICAL FIELD

The present invention relates to a wave type linear motion mechanism for causing partial engagement of a circular nut (rigid female screw) and a flexible screw (flexible male screw) with different leads, and for moving the positions of engagement in a circumferential direction to generate relative linear movement between the elements.

BACKGROUND ART

Wave type linear motion mechanisms are known for use as linear actuators. Wave type linear motion mechanisms comprise a circular nut made of a rigid member, a flexible screw made of a flexible member that is capable of deforming in a radial direction, and a wave generator that causes the flexible screw to deform in the radial direction and partially engage with the circular nut. The flexible screw and the circular nut have different leads. When the wave generator is caused to rotate, the engagement positions move in a circumferential direction, and relative linear movement in the axial direction is generated therebetween. If either the nut or the screw is immobilized, the other will move linearly in the axial direction. Wave type linear motion mechanisms configured as described above are disclosed in patent references 1 and 2.
[Patent reference 1] Japanese Examined Utility Model Publication 6-38195
[Patent reference 2] JP-A 2007-154955

DISCLOSURE OF THE INVENTION

Problems to be Solved by the Invention

When a wave type linear motion mechanism is used to construct a holding mechanism for opening or closing a pair of holding members such as finger members or arm members, two wave type linear motion mechanisms are required to move the holding members. This increases the size of the mechanism and the complexity of the mechanism for transmitting power from a motor or other rotary drive source.

It is an object of the invention to propose a wave type linear motion mechanism enabling a holding mechanism for opening and closing a pair of holding members to be made smaller in size and more compact.
Means Used to Solve the Above-Mentioned Problems To solve the above-mentioned problems, the wave type linear motion mechanism according to the present invention is characterized in comprising:

a flexible screw having a radially deformable, flexible cylinder and a first male screw and a second male screw formed in different axial positions on an external peripheral surface of the flexible cylinder, with the first and second male screws being cut in opposite directions;

a first circular nut having a first rigid cylinder coaxially enclosing the portion of the flexible screw on which the first male screw is formed, and having a first female screw formed on an internal peripheral surface of the first rigid cylinder, with the first female screw being engageable with the first male screw and having a different lead from the first male screw;

a second circular nut having a second rigid cylinder coaxially enclosing the portion of the flexible screw on which the second male screw is formed, and having a second female screw formed on an internal peripheral surface of the second rigid cylinder, with the second female screw being engageable with the second male screw and having a different lead from the second male screw;

a non-circularly contoured first wave generator coaxially fitted into the portion of the flexible screw on which the first male screw is formed;

a non-circularly contoured second wave generator coaxially fitted into the portion of the flexible screw on which the second male screw is formed; and an input shaft on which the first wave generator and the second wave generator are coaxially fixed;

wherein the flexible screw is kept in a state of being incapable of axial movement or rotation about a central axis thereof, and the first and second circular nuts are kept in a state of being capable of axial movement but incapable of rotation about a central axis thereof;

wherein the portion of the flexible screw on which the first male screw is formed is deformed in a noncircular shape by the first wave generator, and is brought into a state in which the first male screw is partially engaged with the first female screw in a circumferential direction;

wherein the portion of the flexible screw on which the second male screw is formed is deformed in a noncircular shape by the second wave generator, and is brought into a state in which the second male screw is partially engaged with the second female screw in a circumferential direction; and the engagement position of the first male screw and the first female screw, and the engagement position of the second male screw and the second female screw each move in a circumferential direction, and the first and second circular nuts move opposite from each other in the axial direction, when the input shaft rotates to cause the first and second wave generators to rotate.

In the case where the first wave generator and second wave generator have an elliptical contour, the portion of the flexible screw on which the first male screw is formed deforms into an elliptical shape by the first wave generator, and is brought into a state in which the portions of the first male screw positioned at either end of the elliptical shape in the direction of the major axis are engaged with the first female screw. The portion of the flexible screw on which the second male screw is formed is deformed into an elliptical shape by the second wave generator, and is brought into a state in which the portions of the second male screw positioned at either end of the elliptical shape in the direction of the major axis are partially engaged with the second female screw.

When the wave type linear motion mechanism of the present invention is used to construct a holding mechanism, the first holding member is mounted on the first circular nut of the wave type linear motion mechanism, and the second holding member is mounted on the second circular nut. A holding mechanism is thereby obtained in which the first and second holding members perform an opening and closing action depending on the direction of rotation of the input shaft.

EFFECT OF THE INVENTION

According to the wave type linear motion mechanism of the present invention, the flexible screw on which the first male screw and second male screw are formed on the external peripheral surface of the flexible cylinder is radially deformed by the first and second wave generators affixed to the shared input shaft, and the first circular nut and second circular nut are in partial engagement. When the input shaft is caused to rotate, the first and second circular nuts move in approaching and separating directions relative to each other. Therefore, when the first and second holding members are respectively mounted on the first and second circular nuts, it will be possible to obtain a holding mechanism for opening or closing the first and second holding members. It is accordingly possible to obtain a holding mechanism that is of smaller size and more compact than in the prior art, where two wave type linear motion mechanisms are used to construct the holding mechanism.

BRIEF DESCRIPTION OF THE DRAWINGS

FIG. 1 is a general schematic diagram of the major parts of the holding mechanism in which the present invention is employed.

KEY

1 Holding mechanism
2 Housing
3 Motor
4 Wave type linear motion mechanism
5 First holding member
6 Second holding member
11 Input shaft
12 First wave generator
13 Second wave generator
14 Flexible screw
15 First circular nut
16 Second circular nut
32 First male screw
33 Second male screw
42 First female screw
44 Second female screw

BEST MODE FOR CARRYING OUT THE INVENTION

With reference to FIG. 1, a holding mechanism 1 according to the present invention comprises a housing 2, a motor 3 mounted on the housing 2, a wave type linear motion mechanism 4 mounted on the housing 2, and a pair of holding members 5, 6 that are opened and closed by the wave type linear motion mechanism 4. Rotation of the motor 3 is transmitted to the wave type linear motion mechanism 4 via a power transmission mechanism comprising, e.g., a timing belt 7, pulleys 8, 9, and the like.

The wave type linear motion mechanism 4 has an input shaft 11, first and second wave generators 12, 13, a flexible screw 14, and first and second circular nuts 15, 16, The input shaft 11 is rotatably supported by the housing 2 via bearings 21, 22. One shaft end 11a of the input shaft 11 protrudes outward from within the housing 2, and the rotary force of the motor is transmitted to the shaft end 11a.

The first wave generator 12 and the second wave generator 13 are attached to the input shaft 11. The first wave generator 12 comprises an elliptically contoured rigid cam plate 23 that is coaxially affixed to or formed integrally with the input shaft 11; and a wave bearing 24 installed on an external peripheral elliptical surface of the rigid cam plate 23. The wave bearing 24 is composed of flexible inner and outer races and a plurality of balls or other rolling members inserted therebetween. The second wave generator 13 has the same configuration, and comprises an elliptically contoured rigid cam plate 25 that is coaxially affixed to or formed integrally with the input shaft 11 in a position set apart from the first wave generator 12 by a prescribed distance in the axial direction of the input shaft 11; and a wave bearing 26 installed on an external peripheral elliptical surface of the rigid cam plate 25.

The flexible screw 14 has a radially deformable flexible cylinder 31 within whose shaft length is accommodated the first wave generator 12 and the second wave generator 13; as well as a first male screw 32 and a second male screw 33 that are formed on an external peripheral surface of the flexible cylinder 31. The flexible screw 14 is attached to the housing 2 in a state of being incapable of moving along the direction of its central axis, or of rotating around its central axis.

The first male screw 32 and the second male screw 33 are cut in opposite directions. The first male screw 32 is formed on an external peripheral surface 31a of the flexible cylinder 31 towards the position of the first wave generator 12 along the axial direction of the cylinder, and the second male screw 33 is formed towards the position of the second wave generator 11 In the present example, the first male screw 32 is formed from the central position in the axial direction of the external peripheral surface 31a to one end thereof, and the second male screw 33 is formed from the central position in the axial direction on the external peripheral surface 31a to the other end thereof. It is possible for the first and second male screws 32, 33 to be formed only in a partial region of the external peripheral surface 31a.

The input shaft 11 to which the first and second wave generators 12, 13 are attached is coaxially installed on an inner side of the flexible screw 14. The flexible screw 14 is deformed in an elliptical shape by the first and second wave generators 12, 13.

The first circular nut 15 has a first rigid cylinder 41 coaxially enclosing the portion of the flexible screw 14 on which the first male screw 32 is formed, and a first female screw 42 that is formed along the entirety of the inner peripheral circular surface of the first rigid cylinder 41. The first female screw 42 is capable of engaging with the first male screw 32, and has a lead that is different from that of the first male screw 32. Similarly, the second circular nut 16 has a second rigid cylinder 43 coaxially enclosing the portion of the flexible screw 14 on which the second male screw 33 is formed, and a second female screw 44 that is formed along the entirety of the inner peripheral circular surface of the second rigid cylinder 43. The second female screw 44 is capable of engaging with the second male screw 33, and has a lead that is different from that of the second male screw 33.

The first and second circular nuts 15, 16 are not restricted by the housing 2 from moving along the axial direction, but are kept in a state of being incapable of rotating around their central axis.

According to the wave type linear motion mechanism 4 having the configuration described above, the portion of the flexible screw 14 deformed into an elliptical shape by the first wave generator 12 and having the first male screw 32 formed thereon is in state of being engaged with the first female screw 42 of the first circular nut 15 on both ends in the direction of the major axis of the ellipsoid Similarly, the portion of the flexible screw 14 deformed into an elliptical shape by the second wave generator 13 and having the second male screw 33 formed thereon is in a state of being engaged with the second female screw 44 of the second circular nut 16 on both ends in the direction of the major axis of the ellipsoid. When the input shaft 11 rotates and the first and second wave generators 12, 13 rotate, the position of engagement between the first male screw 32 and the first female screw 42 and the position of engagement between the second male screw 33 and the second female screw 44 move in the circumferential direction; and the first and second circular nuts 15, 16 move in opposite directions along the axial direction.

A first holding member 5 is mounted on an outer peripheral portion of the first circular nut 15 exposed through the housing 2, and extends in the radial direction of the first circular nut 15. Similarly, a second holding member 6 is attached to the second circular nut 16, the second holding member 6 extending parallel in a state of facing the first holding member 5.

The action of the holding mechanism 1 having the above configuration shall now be described. When the motor 3 is driven and the input shaft 11 is caused to rotate, as previously mentioned, the rotation of the motor 3 is converted by the wave type linear motion mechanism 4 into linear motion of the first circular nut 15 and the second circular nut 16. The first circular nut 15 and the second circular nut 16 move in opposite directions along the direction of a central axis 4a. Therefore, the first holding member 5 and the second holding member 6 mounted thereon open and close in a relative manner. For example, when the first male screw 32 and the second male screw 33 are formed with bilateral symmetry, and the first female screw 42 and the second female screw 44 are formed with bilateral symmetry, the first and second holding members 5, 6 move in opposite directions by the same distance at the same speed. Thus, the first and second holding members 5, 6 can open and close between an object release position shown by the solid line in the drawing and an object holding position shown by the imaginary line, and can hold or release an object W.

The invention claimed is:

1. A wave type linear motion mechanism, comprising: a flexible screw having a radially deformable, flexible cylinder and a first male screw and a second male screw formed in different axial positions on an external peripheral surface of the flexible cylinder, with the first and second male screws being cut in opposite directions;
a first circular nut having a first rigid cylinder coaxially enclosing a portion of the flexible screw on which the first male screw is formed, and having a first female screw formed on an internal peripheral surface of the first rigid cylinder, with the first female screw being engageable with the first male screw and having a different lead from the first male screw;
a second circular nut having a second rigid cylinder coaxially enclosing a portion of the flexible screw on which the second male screw is formed, and having a second female screw formed on an internal peripheral surface of the second rigid cylinder, with the second female screw being engageable with the second male screw and having a different lead from the second male screw;
a non-circularly contoured first wave generator coaxially fitted into the portion of the flexible screw on which the first male screw is formed;
a non-circularly contoured second wave generator coaxially fitted into the portion of the flexible screw on which the second male screw is formed; and
an input shaft on which the first wave generator and the second wave generator are coaxially fixed; wherein the flexible screw is kept in a state of being incapable of axial movement or rotation about a central axis thereof, and the first and second circular nuts are kept in a state of being capable of axial movement but incapable of rotation about a central axis thereof;
wherein the portion of the flexible screw on which the first male screw is formed is deformed in a noncircular shape by the first wave generator, and is brought into a state in which the first male screw is partially engaged with the first female screw in a circumferential direction;
wherein the portion of the flexible screw on which the second male screw is formed is deformed in a noncircular shape by the second wave generator, and is brought into a state in which the second male screw is partially engaged with the second female screw in a circumferential direction; and
an engagement position of the first male screw and the first female screw, and an engagement position of the second male screw and the second female screw each move in a circumferential direction, and the first and second circular nuts move opposite from each other in the axial direction, when the input shaft rotates to cause the first and second wave generators to rotate.

2. The wave type linear motion mechanism according to claim 1, wherein: the first wave generator and the second wave generator have an elliptical contour; the portion of the flexible screw on which the first male screw is formed is deformed into an elliptical shape by the first wave generator, and is brought into a state in which the portions of the first male screw positioned at both ends of the elliptical shape in the direction of the major axis are engaged with the first female screw; and
the portion of the flexible screw on which the second male screw is formed is deformed into an elliptical shape by the second wave generator, and is brought into a state in which the portions of the second male screw positioned at both ends of the elliptical shape in the direction of the major axis are partially engaged with the second female screw.

3. A holding mechanism, comprising: the wave type linear motion mechanism according to claim 1;
a first holding member mounted on the first circular nut of the wave type linear motion mechanism; and
a second holding member mounted on the second circular nut of the wave type linear motion mechanism;
wherein the first and second holding members are opened or closed depending on the rotation direction of the input shaft.

4. A holding mechanism, comprising: the wave type linear motion mechanism according to claim 2; a first holding member mounted on the first circular nut of the wave type linear motion mechanism; and a second holding member mounted on the second circular nut of the wave type linear motion mechanism; wherein the first and second holding members are opened or closed depending on the rotation direction of the input shaft.

* * * * *